US012803053B2

(12) United States Patent
Gutel et al.

(10) Patent No.: US 12,803,053 B2
(45) Date of Patent: Nov. 17, 2026

(54) SPECIFIC POSITIVE ELECTRODES COMPRISING A SPECIFIC SALT FOR ACCUMULATOR OF THE ALKALI METAL ION TYPE

(71) Applicant: COMMISSARIAT A L'ENERGIE ATOMIQUE ET AUX ENERGIES ALTERNATIVES, Paris (FR)

(72) Inventors: Thibaut Gutel, Grenoble (FR); Daniel Tomasi, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 714 days.

(21) Appl. No.: 18/060,850

(22) Filed: Dec. 1, 2022

(65) Prior Publication Data

US 2023/0187698 A1 Jun. 15, 2023

(30) Foreign Application Priority Data

Dec. 9, 2021 (FR) ....................................... 2113210

(51) Int. Cl.
*H01M 4/485* (2010.01)
*H01M 4/505* (2010.01)
(Continued)

(52) U.S. Cl.
CPC ....... *H01M 10/0568* (2013.01); *H01M 4/485* (2013.01); *H01M 4/505* (2013.01);
(Continued)

(58) Field of Classification Search
CPC ......... H01M 10/0568; H01M 10/0569; H01M 10/052; H01M 10/0525; H01M 4/485;
(Continued)

(56) References Cited

U.S. PATENT DOCUMENTS 6,203,944 B1 3/2001 Turner et al.
2008/0280211 A1* 11/2008 Lee .................... H01M 10/052 429/344

(Continued)

FOREIGN PATENT DOCUMENTS

WO 1997031401 A1 8/1997
WO 99/28984 A1 6/1999

(Continued)

OTHER PUBLICATIONS

Search Report for French Application No. 2113210 dated Jul. 22, 2022.
Shanmukaraj, Devaraj et al. Sacrificial salts: Compensating the initial charge irreversibility in lithium batteries:, Electrochemistry Communications, 2010. vol. 12, pp. 1344-1347.

(Continued)

*Primary Examiner* — Joshua L Allen
(74) *Attorney, Agent, or Firm* — Chrisman Gallo Tochtrop LLC

(57) ABSTRACT

The invention relates to a positive electrode for alkali metal-ion accumulator comprising at least one organic binder and at least one alkali metal salt meeting the following formula (I):

(I)

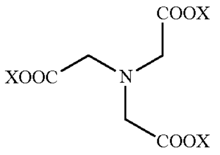

wherein the X represent an alkali element.

18 Claims, 2 Drawing Sheets

(51) Int. Cl.

| | |
|---|---|
| ***H01M 4/525*** | (2010.01) |
| ***H01M 4/62*** | (2006.01) |
| ***H01M 10/0568*** | (2010.01) |
| ***H01M 10/0569*** | (2010.01) |

(52) U.S. Cl.
CPC .......... *H01M 4/525* (2013.01); *H01M 4/622* (2013.01); *H01M 10/0569* (2013.01)

(58) Field of Classification Search
CPC ...... H01M 4/505; H01M 4/525; H01M 4/622; H01M 4/382; H01M 4/5825; H01M 4/623; H01M 4/625; H01M 4/0445; H01M 4/62; H01M 4/13; H01M 2004/028; Y02E 60/10

See application file for complete search history.

(56) References Cited

U.S. PATENT DOCUMENTS

| | | | | |
|---|---|---|---|---|
| 2010/0237298 | A1* | 9/2010 | Armand | H01M 4/606 564/252 |
| 2017/0365882 | A1* | 12/2017 | Luski | H01M 50/414 |
| 2017/0365883 | A1* | 12/2017 | Luski | H01M 10/0567 |

FOREIGN PATENT DOCUMENTS

| | | | |
|---|---|---|---|
| WO | 00/03444 | A1 | 1/2000 |
| WO | 2011/157958 | A1 | 12/2011 |
| WO | 2017/067994 | A1 | 4/2017 |
| WO | 2017/067996 | A1 | 4/2017 |

OTHER PUBLICATIONS

Li, Yangxina et al., “Effective enhancement of lithium-ion battery performance using SLMP”, Electrochemistry Communications, Jul. 2011, vol. 13, No. 7, pp. 664-667.

* cited by examiner

SPECIFIC POSITIVE ELECTRODES COMPRISING A SPECIFIC SALT FOR ACCUMULATOR OF THE ALKALI METAL ION TYPE

CROSS-REFERENCE TO RELATED APPLICATIONS

This application claims priority from French Patent Application No. 2113210 filed on Dec. 9, 2021. The content of this application is incorporated herein by reference in its entirety.

TECHNICAL FIELD

The present invention relates to specific positive electrodes comprising a specific salt for accumulator of the alkali metal ion type, accumulators of the alkali metal ion type comprising this type of electrodes, a method for treating such accumulators and for using said specific salt as sacrificial salt during the first charge of these accumulators.

Alkali metal-ion accumulators are intended to be increasingly used as an autonomous source of energy, in particular, in portable electronic equipment (such as mobile phones, laptops, tools), in order to progressively replace the nickel-cadmium (NiCd) and nickel-metal hydride (NiMH) accumulators. They may also be used to provide the power supply necessary for new micro applications, such as smart cards, sensors or other electromechanical systems.

From the point of view of their operation, these accumulators operate according to the principle of insertion-deinsertion of the alkali ion concerned (such as lithium, for the lithium-ion accumulators, sodium for the sodium-ion accumulators or potassium for the potassium-ion accumulators).

During the discharging of the accumulator, the alkali metal deinserted from the negative electrode in ion form migrates through the ionically conductive electrolyte and is intercalated into the crystal lattice of the active material of the positive electrode. The passage of each alkali ion in the internal circuit of the accumulator is exactly offset by the passage of an electron in the external circuit, thus generating an electric current.

On the other hand, during the charging of the accumulator, the reactions occurring within the accumulator are the inverse reactions of the discharging, namely that:

- the negative electrode will insert the alkali metal in ion form into the lattice of the insertion material constituting it;
- the positive electrode will release the alkali metal in ion form, which will be intercalated into the insertion material of the negative electrode.

During the first charge of the accumulator, when the active material of the negative electrode is brought to an insertion potential of the alkali metal, a portion thereof will react with the electrolyte at the surface of the grains of active material of the negative electrode in order to form a passivation layer at the surface thereof. The formation of said passivation layer consumes a significant quantity of alkali ions, which is materialized by an irreversible loss of capacity of the accumulator (said loss being qualified as irreversible capacity), due to the fact that the alkali ions having reacted are no longer available for the later charging/discharging cycles.

Therefore, said loss should be minimized, as much as possible, during the first charge, so that the energy density of the accumulator is as high as possible.

To do this, it has been proposed, in the prior art, for lithium-ion type accumulators two types of techniques in order to overcome the aforementioned drawback:

- prelithiation techniques of the negative electrode; or
- overlithiation techniques of the positive electrode.

Concerning the prelithiation techniques of the negative electrode, it may be cited:

- the so-called "in situ" techniques consisting in depositing onto the negative electrode lithium metal (that is to say at "0" degree of oxidation) either in the form of a metal sheet (as described in WO 1997031401) or in the form of a lithium metal powder stabilized by a protective layer (as described in Electrochemistry Communications 13 (2011) 664-667) mixed with the ink comprising the ingredients of the negative electrode (namely, the active material, the electronic conductors and an organic binder), the lithium insertion taking place, independently of the alternative retained, spontaneously by a corrosion phenomenon;
- the so-called "ex situ" techniques consisting in electrochemically prelithiating the negative electrode, by placing it in a set-up including an electrolytic bath and a counter-electrode comprising lithium, these techniques make it possible to control the quantity of lithium introduced into the negative electrode but however have the drawback of requiring the implementation of a complex experimental set-up.

Alternatively, it has also been proposed, in the prior art, techniques of overlithiation of the positive electrode, notably, by adding in the composition comprising the ingredients that constitute the positive electrode, a sacrificial salt which, during the first charge, will decompose and provide the required quantity of Li in order to form the passivation layer at the surface of the negative electrode.

In these techniques, it should be noted that the sacrificial salt must be able to decompose at a potential located in a potential window that scans the positive electrode during the first charge of the formation cycle.

In addition, when the first charge of the formation cycle takes place, when for example lithium accumulators are taken, two simultaneous electrochemical reactions generate $Li^+$ ions, which are the deinsertion of lithium from the positive electrode and the decomposition of the sacrificial salt.

These techniques are particularly described in WO99/28984, which describes two families of lithium salts that can be used as sacrificial salts of lithium oxocarbons/dicarboxylates and lithium azides/oxyhydrazides, these salts being able to be decomposed by high-potential oxidation (between 3 V and 5 V vs $Li^+/Li$) by generating $CO_2$ and $N_2$ on the one hand and lithium ions available for the system on the other hand.

In view of what already exists, the authors therefore propose to develop new positive electrodes comprising a specific salt that may make it possible to effectively form a passivation layer at the surface of the negative electrode during the formation cycle or that may be used as ion reserves during the life of the accumulator, wherein the electrode will be incorporated. Moreover, the specific salt implemented will decompose at potentials similar to those already used in the prior art but with higher theoretical and practical capacities while generating fewer gaseous by-products.

DESCRIPTION OF THE INVENTION

Thus, the invention relates to a positive electrode for alkali metal-ion accumulator comprising at least one organic binder and at least one alkali metal salt meeting the following formula (I):

(I)

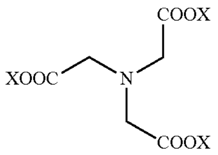

wherein the X represent an alkali element.

It is specified that positive electrode means, conventionally, in the foregoing and in the following, that this is the electrode that acts as a cathode, when the generator delivers current (that is to say when it is in the process of discharging) and that acts as an anode when the generator is in the process of charging.

The authors of the invention were able to highlight that this type of salt present in a positive electrode for alkali metal-ion accumulator, once it has been incorporated into an accumulator and the accumulator subjected to the first charge of the formation cycle, could act as sacrificial salt with higher theoretical and practical capacities (therefore releases more lithium per gram) while generating fewer gaseous by-products the elimination of which proves to be delicate during said formation cycle in relation to structurally similar salts such as those illustrated in Comparative Examples 1 and 2 below. Moreover, said alkali metal salt may be used as a reserve of ions during the life of the accumulator or for making the electrode work over a particular range of capacities.

As mentioned above, the alkali metal salt meets the following formula (I):

(I)

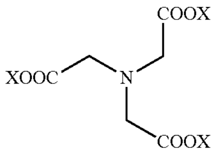

wherein the X represent an alkali element.

The X may represent, in particular, the lithium element (particularly when the electrode is intended for a lithium-ion accumulator), the sodium element (particularly when the electrode is intended for a sodium-ion accumulator) or the potassium element (particularly when the electrode is intended for a potassium-ion accumulator).

The electrode also comprises at least one organic binder, preferably, a polymeric binder, such as:

- fluorinated (co)polymers, such as polytetrafluoroethylene (known under the abbreviation PTFE), polyvinylidene fluoride (known under the abbreviation PVDF), poly (vinylidene fluoride-co-hexafluoropropylene) (known under the abbreviation PVDF-HFP);
- elastomer polymers, such as styrene-butadiene rubber (known under the abbreviation SBR), ethylene propylene diene monomer (known under the abbreviation EPDM) copolymer;
- polymers of the family of polyvinyl alcohols;
- cellulosic polymers, such as carboxymethyl cellulose (known under the abbreviation CMC);
- polymers of the family of poly(meth)acrylates, such as poly(methyl methacrylate) (known under the abbreviation PMMA);
- polymers of the family of polyacrylic acids (known under the abbreviation PAA); and
- mixtures thereof.

Furthermore, the electrode may comprise at least one electronically conductive additive, that is to say an additive likely to give to the electrode, wherein it is incorporated, an electronic conductivity, this additive being able to be, for example, selected from carbon materials such as carbon black, carbon nanotubes, carbon fibres (in particular, vapour grown carbon fibres known under the abbreviation VGCF), graphite in powder form, graphite fibres, graphene and mixtures thereof.

Furthermore, in addition to other ingredients already mentioned above, the electrode may further comprise advantageously at least one electrode active material, namely a material capable of intercalating or deintercalating alkali ions such as lithium ions, when the accumulator is a lithium-ion accumulator; sodium ions, when the accumulator is a sodium-ion accumulator; potassium ions, when the accumulator is a potassium-ion accumulator.

When the positive electrode is intended for a lithium accumulator, the electrode active material may be selected from:

- metal chalcogenides of formula $LiMQ_2$, wherein M is at least one metal element selected from the metal elements, such as Co, Ni, Fe, Mn, Cr, V, Al and Q is a chalogen, such as O or S, the preferred metal chalcogenides being those of formula $LiMO_2$, with M being such as defined above, such as, preferably, $LiCoO_2$, $LiNiO_2$, $LiNi_xCo_{1-x}O_2$ (with $0<x<1$), with a material based on lithium-nickel-manganese-cobalt $LiNi_xMn_yCo_zO_2$ with $x+y+z=1$ (also known under the abbreviation NMC), such as $LiNi_{0.33}Mn_{0.33}Co_{0.33}O_2$, or a material based on lithium-nickel-cobalt-aluminium $LiNi_xCo_yAl_zO_2$ with $x+y+z=1$ (also known under the abbreviation NCA), such as $LiNi_{0.8}Co_{0.15}Al_{0.05}O_2$;
- chalcogenides of spinel structure, such as $LiMn_2O_4$;
- lithiated or partially lithiated materials of formula $M_1M_2(JO_4)_fE_{1-f}$, wherein $M_1$ is lithium, which may be partially substituted with another alkali element up to a substitution level of less than 20%, $M_2$ is a transition metal element of oxidation level +2 selected from Fe, Mn, Ni and combinations thereof, which may be partially substituted with one or more other additional metal elements of oxidation level(s) between +1 and +5 up to a substitution level of less than 35%, $JO_4$ is an oxyanion wherein J is selected from P, S, V, Si, Nb, Mo and combinations thereof, E is a fluoride, hydroxide or chloride anion, f is the mole fraction of the oxyanion $JO_4$ and is, generally, between 0.75 and 1 (including 0.75 and 1).

More specifically, the lithiated or partially lithiated materials may be based on phosphorus (which means, in other terms, that the oxyanion meets the formula $PO_4$) and may have a structure of the ordered or modified olivine type.

The lithiated or partially lithiated materials may meet the specific formula $Li_{3-x}M'_yM''_{2-y}(JO_4)_3$, wherein $0≤x≤3$, $0≤y≤2$, M' and M" represent identical or different metal elements, at least one of the M' and M" being a transition metal element, $JO_4$ is, preferably, $PO_4$, which may be partially substituted with another oxyanion with J being selected from S, V, Si, Nb, Mo and combinations thereof.

The lithiated or partially lithiated materials may meet the formula $Li(Fe_xMn_{1-x})PO_4$, wherein $0≤x≤1$ and, preferably, x is equal to 1 (which means, in other terms, that the corresponding material is $LiFePO_4$).

The positive electrodes may consist exclusively of at least one alkali metal salt of formula (I) such as defined above, of at least one organic binder such as a polymeric binder and optionally of at least one electronically conductive additive such as defined above. Such electrodes may be used in a device of the accumulator type in view of prealkalising a negative electrode, this negative electrode once the prealkalising operation has been performed may subsequently be extracted from said device and incorporated into an alkali metal-ion accumulator.

The positive electrodes may also consist exclusively of at least one alkali metal salt of formula (I) such as defined above, of at least one organic binder such as a polymeric binder, of at least one active material such as defined above and optionally of at least one electronically conductive additive such as defined above, in which case they may act as permanent electrodes in an accumulator and be used to form the passivation layer during the first charge applied to the accumulator.

According to a first embodiment, the electrodes of the invention may thus be, from the point of their constitution, in the form of a part, for example, parallelepiped or in the form of a pellet, comprising a composite material comprising a polymer matrix consisting of one or more polymeric binders (for example, one or more specific polymeric binders such as defined above) and comprising, as charges, at least one alkali metal salt of formula (I) such as defined above and, optionally, at least one active material, such as defined above and optionally one or more electronically conductive additives, such as those defined above. A specific electrode in accordance with this first embodiment may be an electrode consisting of a composite material comprising a polymer matrix consisting of PVDF and comprising, as charges, an alkali metal salt of formula (I) such as defined above, an active material such as defined above and an electronically conductive additive, such as carbon black (for example, SuperP®).

According to a second embodiment, when the electrodes comprise, in addition to other ingredients, at least one electrode active material, the electrodes of the invention may be in the form of a first portion comprising a composite material comprising a polymer matrix consisting of one or more polymeric binders (for example, one or more specific polymeric binders such as defined above) and comprising, as charges, at least one active material and, optionally, one or more electronically conductive additives, such as those defined above and a second portion, in the form of a layer deposited on the surface of the first portion, said layer comprising a polymer matrix consisting of one or more polymeric binders (for example, one or more specific polymeric binders such as defined above) and comprising, as charges, at least one alkali metal salt of formula (I) such as defined above. With such an embodiment, at the end of the first charge of the formation cycle, the layer comprising the alkali metal salt decomposes, fully or partially, to give the alkali ions necessary for the formation of the passivation layer on the negative electrode, without this disorganising the internal structure of the positive electrode, this, at the end of the first charge, having a structural organisation similar to that of a conventional electrode, particularly with no appearance of dead volume and of loss of active material. On the other, hand, as opposed to the embodiments of the prior art, where the sacrificial salt is introduced directly into the precursor composition of the positive electrode and where it is necessary to include a quantity of salt greater than that necessary for the formation of the passivation layer due to the impossibility of controlling the placement of the salt grains in the structure of the electrode, the method of the invention gives the possibility of using, due to the location of the alkaline salt just at the surface of the positive electrode, only the quantity sufficient for the formation of the passivation layer on the negative electrode. In this case, there is therefore no excess salt in the positive electrode after formation of the passivation layer and therefore of unnecessary material therein.

The positive electrodes are advantageously in contact with a current collector, for example, an aluminium sheet.

The positive electrodes of the invention are intended to be incorporated into an alkali metal-ion accumulator cell, which is also one of the objects of the invention and thus comprises a positive electrode such as defined above, a negative electrode and an electrolyte disposed between the positive electrode and the negative electrode.

It is specified that negative electrode means, conventionally, in the foregoing and in the following, the electrode that acts as an anode, when the generator delivers current (that is to say when it is in the process of discharging) and that acts as a cathode when the generator is in the process of charging.

Conventionally, the negative electrode comprises, as electrode active material, a material capable of inserting, reversibly, alkali ions (such as lithium ions, when the accumulator is a lithium-ion accumulator; sodium ions, when the accumulator is a sodium-ion accumulator; potassium ions, when the accumulator is a potassium-ion accumulator.

When negative electrode is intended for a lithium accumulator, the negative electrode active material may be selected from:

- carbon materials, such as graphitic carbon capable of intercalating lithium that may exist, typically, in the form of a powder, of flakes, of fibres or of spheres (for example, mesocarbon microbeads);
- silicon-based compounds, such as silicon carbide SiC or silicon oxide $SiO_x$;
- metallic lithium;
- lithium alloys, such as those described in U.S. Pat. No. 6,203,944 and/or WO 00/03444;
- lithiated titanium oxides, such as an oxide of formula $Li_{(4-x)}M_xTi_5O_{12}$ or $Li_4M_yTi_{(5-y)}O_{12}$ wherein x and y range from 0 to 0.2, M represents an element selected from Na, K, Mg, Nb, Al, Ni, Co, Zr, Cr, Mn, Fe, Cu, Zn, Si and Mo, a specific example being $Li_4Ti_5O_{12}$, these oxides being lithium insertion materials having a low level of physical expansion after having inserted the lithium;
- non-lithiated titanium oxides, such as $TiO_2$;
- oxides of formula $M_yTi_{(5-y)}O_{12}$ wherein y ranges from 0 to 0.2 and M is an element selected from Na, K, Mg, Nb, Al, Ni, Co, Zr, Cr, Mn, Fe, Cu, Zn, Si and Mo;
- lithium-germanium alloys, such as those comprising crystalline phases of formula $Li_{4.4}Ge$; or
- a mixture thereof, such as a mixture comprising graphite and a silicon-based compound.

Furthermore, in the same way as for the positive electrode, the negative electrode may comprise an organic binder, such as a polymeric binder, such as polyvinylidene fluoride (PVDF), a carboxymethyl cellulose mixture with a latex of the styrene and/or butadiene type as well as optionally one or more electrically conductive additives, which may be carbon materials, such as carbon black. What is more, in the same way as for the positive electrode, the negative electrode may be, from a structural point of view, like a composite material comprising a matrix made of polymeric binder(s) within which are dispersed charges constituted by the active material (being, for example, in particulate form) and optionally the electrically conductive additive or additives, said composite material able to be deposited on a current collector.

The electrolyte disposed between the positive electrode and the negative electrode may be a conductive liquid electrolyte of alkali ions, which may comprise (or even consists of) at least one organic solvent and at least one metal salt and optionally a compound of the family of vinyl compounds.

The organic solvent(s) may be carbonate solvents and, more specifically:

- cyclic carbonate solvents, such as ethylene carbonate (symbolized by the abbreviation EC), propylene carbonate (symbolized by the abbreviation PC), butylene carbonate, vinylene carbonate, fluoroethylene carbonate, fluoropropylene carbonate and mixtures thereof;
- linear carbonate solvents, such as diethyl carbonate (symbolized by the abbreviation DEC), dimethyl carbonate (symbolized by the abbreviation DMC), ethylmethyl carbonate (symbolised by the abbreviation EMC) and mixtures thereof.

The organic solvent(s) may also be ester solvents (such as ethyl propionate, n-propyl propionate), nitrile solvents (such as acetonitrile) or ether solvents (such as dimethyl ether, 1,2-dimethoxyethane).

The metal salt(s) may be selected from the salts of following formulas: MeI, $Me(PF_6)_n$, $Me(BF_4)n$, $Me(ClO_4)_n$, $Me(bis(oxalato)borate)_n$ (that may be designated by the abbreviation $Me(BOB)_n$), $MeCF_3SO_3$, $Me[N(FSO_2)_2]_n$, $Me[N(CF_3SO_2)_2]_n$, $Me[N(C_2F_5SO_2)_2]_n$, $Me[N(CF_3SO_2)(R_FSO_2)]_n$, wherein $R_F$ is a group $—C_2F_5$, $—C_4F_9$ or $—CF_3OCF_2CF_3$, $Me(AsF_6)_n$, $Me[C(CF_3SO_2)_3]_n$, $Me_2S_n$, $Me(C_6F_3N_4)$ ($C_6F_3N_4$ corresponding to 4,5-dicyano-2-(trifluoromethyl)imidazole and, when Me is Li, the salt corresponds to lithium 4,5-dicyano-2-(trifluoromethyl)imidazole, this salt being known under the abbreviation LiTDI), wherein Me is a metal element and, preferably, a metal transition element, an alkali element or an alkaline earth element and, more preferably, Me is Li (particularly, when the accumulator of the invention is a lithium-ion or lithium-air accumulator), Na (particularly, when the accumulator is a sodium-ion accumulator), K (particularly, when the accumulator is a potassium-ion accumulator).

When Me is Li, the salt is, preferably, $LiPF_6$.

The concentration of the metal salt in the liquid electrolyte is, advantageously, of at least 0.01 M, preferably of at least 0.025 M and, more preferably, of at least 0.05 M and, advantageously, of at most 5 M, preferably, of at most 2 M and, more preferably, of at most, 1 M.

A liquid electrolyte that may be used in the accumulators of the invention, particularly when this concerns a lithium-ion accumulator, is an electrolyte comprising a mixture of carbonate solvents (for example, a mixture of cyclic carbonate solvents, such as a mixture of ethylene carbonate and of propylene carbonate and has, for example, in identical volume), a lithium salt, for example, $LiPF_6$ (for example, 1 M).

The liquid electrolyte may be within a separator disposed between the positive electrode and the negative electrode, said separator may consist of a porous polymer membrane, such as a polyolefin membrane.

Finally, the invention relates to a method for treating the accumulator cell such as defined comprising a step of forming a passivation layer at the surface of the negative electrode with the X ions from the decomposition of the alkali metal salt of formula (I) such as defined above by applying a first charge to the abovementioned cell. It is fully understood that the X ions are alkali ions directly from the X of the alkali metal salt of formula (I).

In other terms, the first charge is applied in potential conditions necessary for the decomposition of the alkali metal salt present at the positive electrode, this decomposition resulting in a release of alkali ions, which will contribute to the formation of the passivation layer at the surface of the negative electrode. Due to the fact that the alkaline salt provides the alkali ions necessary for the formation of the passivation layer, it is thus possible to qualify this salt as "sacrificial salt".

In addition, when the positive electrode further comprises at least one electrode active material, the alkali ions necessary for the formation of the passivation layer are not from said active material of the positive electrode. The alkali ions of the active material of the electrode therefore are not lost for the formation of said layer during the first charge and therefore the loss of capacity of the accumulator is reduced or even zero.

The cell in accordance with the invention is subjected, in accordance with the method of the invention, to a step of first charge in potential conditions necessary for the decomposition of the alkali metal salt in the positive electrode, the decomposition materializing by releasing alkali ions, which will contribute to the formation of the passivation layer.

In addition, from a practical point of view, it is understood that the alkali metal salt must be able to decompose in a potential window that can support the positive electrode during the first charge.

Thus, during the implementation of the first charge, apart from the fact that the accumulator cell charges, a decomposition reaction of the alkali metal salt follows. During this reaction, the alkali metal salt produces alkali ions that pass into the electrolyte and react with it to form the passivation layer at the active material particles of the negative electrode. In addition to releasing alkali ions, the decomposition of the salt results in the production of a low quantity of gaseous compounds. These may be soluble in the electrolyte and may, if necessary, be eliminated during a degassing step.

Finally, the invention relates to the use of a salt of following formula (I):

(I)

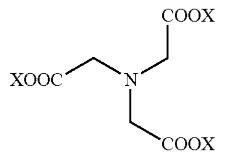

wherein the X represent an alkali element as sacrificial salt for the formation of a passivation layer at the surface of a negative electrode of an alkali metal-ion accumulator, which further comprises a positive electrode comprising said salt and an electrolyte disposed between the positive electrode and the negative electrode.

Other features and advantages of the invention will become apparent from the additional description that follows and that relates to specific embodiments.

Of course, this additional description is given by way of illustration of the invention and in no way constitutes a limitation.

DETAILED DESCRIPTION OF SPECIFIC EMBODIMENTS

Example 1

Figure 1:
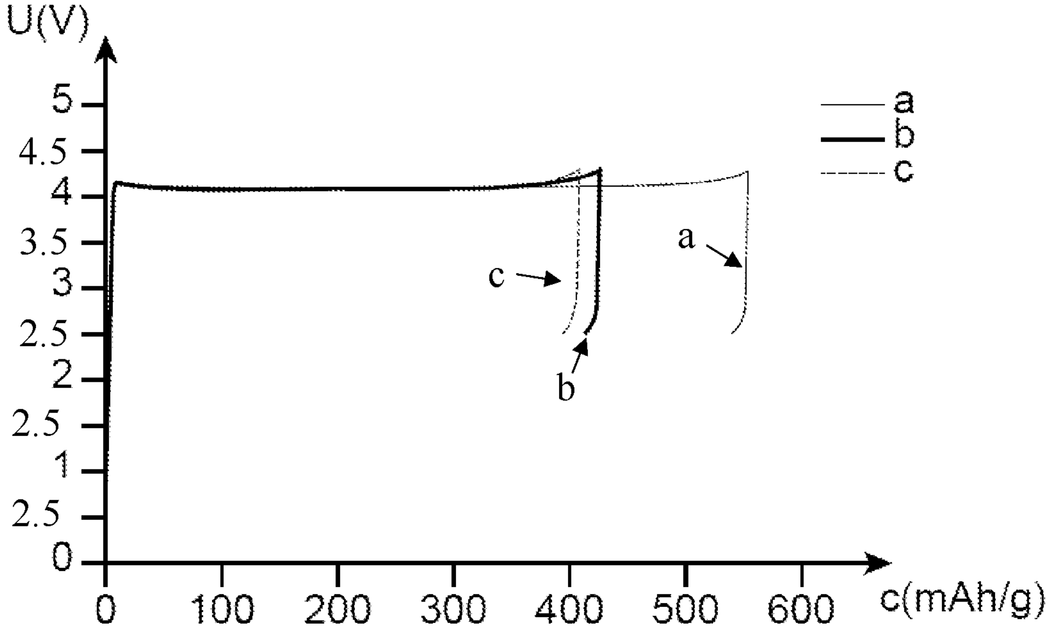
FIG. 1 is a graph illustrating the evolution of the voltage U (in V vs $Li^+/Li$) depending on the specific capacity C (in mAh/g), the curve a) being representative of the battery obtained with the composite electrode comprising the salt of Example 1, the curve b) being representative of the battery obtained with the composite electrode comprising the salt of Comparative Example 1 and the curve c) being representative of the battery obtained with the composite electrode comprising the salt of Comparative Example 2.

This example illustrates the preparation of a lithium salt that can be used for preparing a positive electrode in accordance with the invention, this lithium salt meeting the following formula:

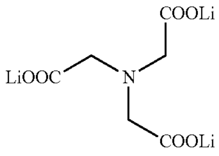

Nitrilotriacetic acid (1 g) is dispersed in 50 mL of ultra-pure water before adding lithium hydroxide (3 equivalents, 0.65 g). After 24 hours of stirring at ambient temperature, the water is evaporated with the aid of a rotary evaporator. The compound quantitatively obtained is subsequently characterized by x-ray diffraction (DRX) and infrared spectroscopy. The purity and the water content of the hydrated structures are determined by elementary and thermogravimetric analysis. The compound is subsequently vacuum desolvated at 250° C. This compound has a theoretical capacity of 384 mAh/g and a measured capacity of 550 mAh/g and a theoretical released gas volume of 2.5 eq. mol.

Comparative Example 1

This example illustrates the preparation of a lithium salt that can be used for preparing a positive electrode not in accordance with the invention, this lithium salt meeting the following formula:

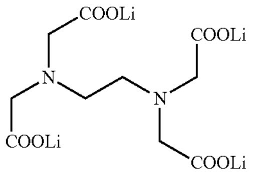

Ethylenediaminetetraacetic acid (1 g) is dispersed in 50 mL of ultra-pure water before adding lithium hydroxide (4 equivalents, 0.57 g). After 24 hours of stirring at ambient temperature, the water is evaporated with the aid of a rotary evaporator. The compound quantitatively obtained is subsequently characterized by x-ray diffraction (DRX) and infrared spectroscopy. The purity and the water content of the hydrated structures are determined by elementary and thermogravimetric analysis. The compound is subsequently vacuum desolvated at 250° C. This compound has a theoretical capacity of 339 mAh/g and a measured capacity of 424 mAh/g and a theoretical released gas volume of 3 eq. mol.

Comparative Example 2

This example illustrates the preparation of a lithium salt that can be used for preparing a positive electrode not in accordance with the invention, this lithium salt meeting the following formula:

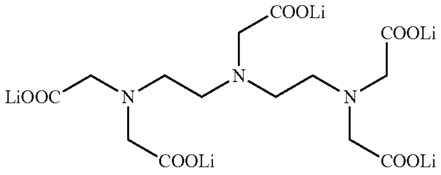

Diethylenetriaminepentaacetic acid (1 g) is dispersed in 50 mL of ultra-pure water before adding lithium hydroxide (5 equivalents, 0.53 g). After 24 hours of stirring at ambient temperature, the water is evaporated with the aid of a rotary evaporator. The compound quantitatively obtained is subsequently characterized by x-ray diffraction (DRX) and infrared spectroscopy. The purity and the water content of the hydrated structures are determined by elementary and thermogravimetric analysis. The compound is subsequently vacuum desolvated at 250° C. This compound has a theoretical capacity of 316 mAh/g and a measured capacity of 407 mAh/g and a theoretical released gas volume of 3.3 eq. mol.

Example 2

This example illustrates the preparation of test electrodes comprising salts prepared in the previous examples, these electrodes being intended just to analyze the electrochemical decomposition of said salts in a context of button cell facing a metal lithium electrode or in a "Pouch Cell" configuration facing an electrode comprising $Li_4Ti_5O_{12}$. In this regard, they do not comprise electrode active materials in addition to salts, as opposed to what should be for electrodes intended to operate in a real battery context.

Three types of these electrodes are prepared:

- an electrode comprising the lithium salt of Example 1;
- an electrode comprising the lithium salt of Comparative Example 1; and
- an electrode comprising the lithium salt of Comparative Example 2.

The protocol for preparing these electrodes is the following.

The appropriate salt is mixed with the SuperP® carbon black in a mortar then all of this is dispersed within a solution comprising PVDF in NMP (N-methyl-2-pyrrolidone), in order to obtain an ink, the dry extract of which consists of 60% by weight of salt, 30% by weight of carbon black and 10% by weight of PVDF. This ink is spread on an aluminium sheet having a thickness of 100 μm wet and, after drying at 55° C., the deposit obtained is cut into a disk of 14 mm of diameter, calendered at a pressure of 10 tonnes and vacuum dried.

Example 3

In this example, the electrodes prepared in Example 2 are each assembled, facing a metal lithium counter-electrode with a polyolefin separator soaked with an organic electrolyte (solution of $LiPF_6$ 1 M in a mixture of ethylene carbonate/propylene carbonate/dimethyl carbonate in 1/1/3 proportions in volume) within a battery of button cell format. The 3 batteries thus formed are subjected to a charge/discharge cycle at a rate of C/20.

The results of this cycle are reported in FIG. 1, which illustrates the evolution of the voltage U (in V vs $Li^+/Li$) depending on the specific capacity C (in mAh/g), the curve a) being representative of the battery obtained with the composite electrode comprising the salt of Example 1, the curve b) being representative of the battery obtained with the composite electrode comprising the salt of Comparative Example 1 and the curve c) being representative of the battery obtained with the composite electrode comprising the salt of Comparative Example 2.

It becomes apparent from this figure, that with the battery obtained with the composite electrode comprising the salt of Example 1, the decomposition took place at approximately 4.1 V vs $Li^+/Li$, that it is totally irreversible (no reduction phenomenon) and that it corresponds to 550 mAh/g of equivalent of released lithium ions, which is a substantial improvement in relation to the batteries obtained with the salts of Comparative Examples 1 and 2.

Example 4

In this example, an electrode in accordance with Example 2 (the electrode comprising the salt of Example 1) is assembled facing a counter-electrode based on $Li_4Ti_5O_{12}$ (LTO) with a polyolefin separator soaked with an organic electrolyte (solution of $LiPF_6$ 1 M in a mixture of ethylene carbonate/propylene carbonate/dimethyl carbonate in 1/1/3 proportions in volume) within a single-side cell of the "Pouch Cell" type including a third metal lithium electrode being used as a reference electrode.

Figure 2:
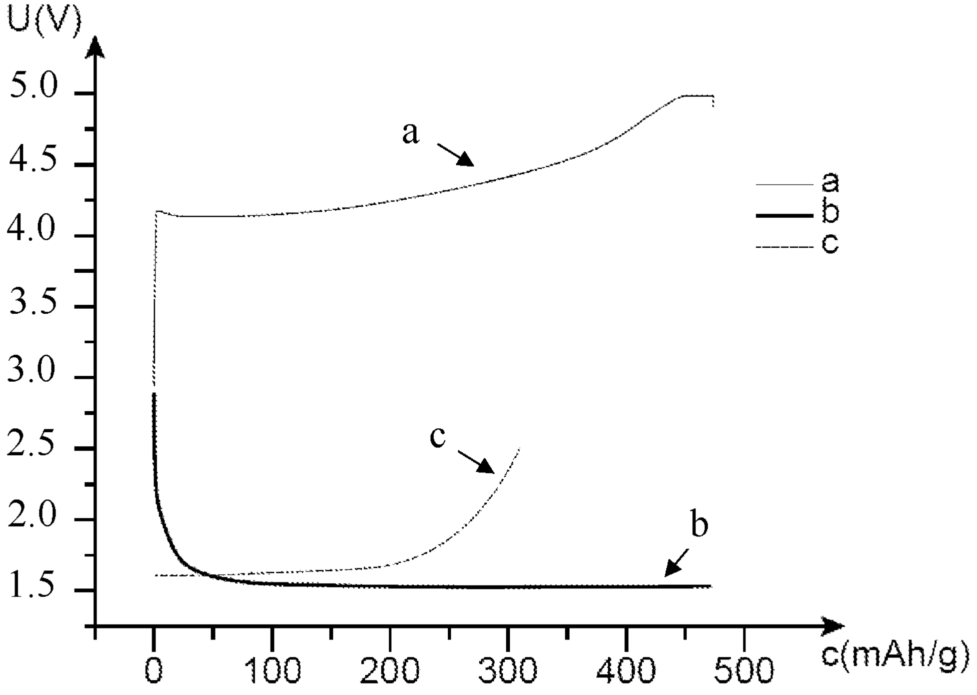
FIG. 2 is a graph illustrating, for a cell obtained with the electrode comprising the salt of Example 1, the evolution of the voltage U (in V vs $Li^+/Li$) depending on the specific capacity C (in mAh/g) with the curve a) being representative of the electrode comprising the salt of Example 1 during the first charge, the curve b) being representative of the counter-electrode based on $Li_4Ti_5O_{12}$ during the first charge and the curve c) being representative of the counter-electrode based on $Li_4Ti_5O_{12}$ during the second discharge.

The cell obtained is subjected to a charge/discharge cycle performed at a rate of C/20 by controlling the potential of the electrodes in relation to the reference electrode. The results are reported, in FIG. 2, which illustrates the evolution of the voltage U (in V vs $Li^+/Li$) depending on the specific capacity C (in mAh/g) with the curve a) being representative of the electrode comprising the salt of Example 1 during the first charge, the curve b) being representative of the counter-electrode based on $Li_4Ti_5O_{12}$ during the first charge and the curve c) being representative of the counter-electrode based on $Li_4Ti_5O_{12}$ during the first discharge.

This experiment makes it possible to demonstrate that the lithium released by the decomposition of the salt is indeed available and inserted into the LTO counter-electrode and that it is possible to deinsert it during the discharge.

What is claimed is:

1. A positive electrode for alkali metal-ion accumulator comprising at least one alkali metal salt meeting the following formula (I):

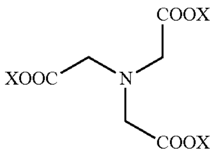

(I)

wherein X represents an alkali element, and said electrode being in the form of a first portion comprising a composite material comprising a polymer matrix consisting of one or more polymeric binders and comprising, as charges, at least one active material and, optionally, one or more electronically conductive additives and comprising a second portion, in the form of a layer deposited on the surface of the first portion, said layer comprising a polymer matrix consisting of one or more polymeric binders and comprising, as charges, the at least one alkali metal salt of formula (I) and one or more electronically conductive additives, and wherein said layer is configured to decompose electrochemically at a voltage within an operating potential window of the positive electrode during a first charge of an accumulator and releases alkali metal ions.

2. A positive electrode according to claim 1, wherein, for formula (I), X represents a lithium element, a sodium element or a potassium element.

3. A positive electrode according to claim 1, wherein, for formula (I), X represents a lithium element.

4. A positive electrode according to claim 1, further comprising at least one electrode active material.

5. A positive electrode according to claim 4, wherein, when the positive electrode is intended for a lithium accumulator, the at least one electrode active material is selected from:

metal chalcogenides of formula $LiMQ_2$, wherein M is at least one metal element, and Q is a chalcogen;

chalcogenides of spinel structure; or lithiated or partially lithiated materials of formula $M_1M_2(JO_4)_fE_{1-f}$, wherein $M_1$ is lithium, optionally partially substituted with another alkali element up to a substitution level of less than 20%, $M_2$ is a transition metal element of oxidation level +2 selected from Fe, Mn, Ni and combinations thereof, optionally partially substituted with one or more other additional metal elements of oxidation level(s) between +1 and +5 up to a substitution level of less than 35%, $JO_4$ is an oxyanion wherein J is selected from P, S, V, Si, Nb, Mo and combinations thereof, E is a fluoride, hydroxide or chloride anion, f is the mole fraction of the oxyanion $JO_4$ and is, generally, between 0.75 and 1 (including 0.75 and 1).

6. The positive electrode of claim 5, wherein M is at least one metal element selected from Co, Ni, Fe, Mn, Cr, V, and Al.

7. The positive electrode of claim 5, wherein the chalcogenide of spinel structure is $LiMn_2O_4$.

8. A positive electrode according to claim 1, further comprising in the first portion at least one electronically conductive additive.

9. A positive electrode according to claim 1, wherein the layer deposited on the surface of the first portion further comprises at least one electrode active material.

10. An alkali metal-ion accumulator cell comprising a positive electrode defined according to claim 1, a negative electrode and an electrolyte disposed between the positive electrode and the negative electrode.

11. An alkali metal-ion accumulator cell according to claim 10, wherein the negative electrode comprises, as electrode active material, an active material selected from:

carbon materials;

silicon-based compounds;

metallic lithium;

lithium alloys;

lithiated titanium oxides;

non-lithiated titanium oxides;

oxides of formula $M_yTi_{(5-y)}O_{12}$ wherein y ranges from 0 to 0.2 and M is an element selected from Na, K, Mg, Nb, Al, Ni, Co, Zr, Cr, Mn, Fe, Cu, Zn, Si and Mo;

lithium-germanium alloys; or a mixture thereof.

12. The alkali metal-ion accumulator cell according to claim 11, wherein the carbon materials are graphitic carbon capable of intercalating lithium.

13. The alkali metal-ion accumulator cell according to claim 11, wherein the silicon-based compounds are silicon carbide SiC or silicon oxide $SiO_x$.

14. The alkali metal-ion accumulator cell according to claim 11, wherein the lithiated titanium oxide is an oxide of formula $Li_{(4-x)}M_xTi_5O_{12}$ or $Li_4M_yTi_{(5-y)}O_{12}$ wherein x and y range from 0 to 0.2, M represents an element selected from Na, K, Mg, Nb, Al, Ni, Co, Zr, Cr, Mn, Fe, Cu, Zn, Si and Mo.

15. The alkali metal-ion accumulator cell according to claim 11, wherein the non-lithiated titanium oxide is $TiO_2$.

16. An alkali metal-ion accumulator cell according to claim 10, wherein the electrolyte is a conductive liquid electrolyte of alkali ions comprising at least one organic solvent and at least one metallic salt.

17. A method for treating the accumulator cell defined according to claim 10, comprising a step of forming a passivation layer at the surface of the negative electrode with X ions from the decomposition of the alkali metal salt of formula (I) by applying a first charge to the abovementioned cell, and wherein such first charge electrochemically decomposes the layer comprising a polymer matrix consisting of one or more polymeric binders and comprising, as charges, the at least one alkali metal salt of formula (I).

18. The positive electrode according to claim 1, wherein the second portion, in the form of the layer deposited on the surface of the first portion, comprises as a main component the at least one alkali metal salt of formula (I).

* * * * *